United States Patent [19]

Tsutsumi

[11] Patent Number: 5,219,512
[45] Date of Patent: Jun. 15, 1993

[54] IMPROVED PRESSURE-HOLDING CHAMBER TYPE INJECTION MOLDING PROCESS AND APPARATUS FOR INJECTION MOLDING OF PRODUCTS

[75] Inventor: Shigeru Tsutsumi, Yonezawa, Japan
[73] Assignee: Seiki Corporation, Tokyo, Japan
[21] Appl. No.: 476,504
[22] PCT Filed: Oct. 12, 1989
[86] PCT No.: PCT/JP89/01052
§ 371 Date: Jul. 30, 1990
§ 102(e) Date: Jul. 30, 1990
[87] PCT Pub. No.: WO90/03879
PCT Pub. Date: Apr. 19, 1990

[30] Foreign Application Priority Data
Oct. 13, 1988 [JP] Japan .................. 63-256011
May 30, 1989 [JP] Japan .................. 1-134576
Sep. 18, 1989 [JP] Japan .................. 1-241467

[51] Int. Cl.$^5$ ............................................ B29C 45/38
[52] U.S. Cl. ......................... 264/328.8; 264/328.13; 264/328.14; 264/328.19; 425/145; 425/149; 425/547; 425/561; 425/562
[58] Field of Search ............. 264/328.8, 328.9, 328.11, 264/328.13, 328.14, 328.15, 328.16, 328.19, 40.5; 425/145, 149, 547-550, 552, 555, 557, 561, 562, 567, 574

[56] References Cited

U.S. PATENT DOCUMENTS

| | | |
|---|---|---|
| Re. 28,721 | 2/1976 | Farrell ..................... 425/159 |
| 2,505,540 | 4/1950 | Goldhard . |
| 3,800,027 | 3/1974 | Tsutsumi . |
| 4,150,088 | 4/1979 | Chang et al. . |
| 4,164,523 | 8/1979 | Hanning . |
| 4,212,627 | 7/1980 | Gellert . |
| 4,256,689 | 3/1981 | Gardner . |
| 4,330,258 | 5/1982 | Gellert . |
| 4,563,324 | 1/1986 | Kubat et al. . |
| 4,632,652 | 12/1986 | Farrell . |
| 4,722,679 | 2/1988 | Farrell . |
| 4,784,819 | 11/1988 | Spurr . |
| 4,846,651 | 7/1989 | Matsuda et al. . |
| 4,976,900 | 12/1990 | Tsutsumi .................. 264/39 |

FOREIGN PATENT DOCUMENTS

| | | |
|---|---|---|
| 204133 | 4/1986 | European Pat. Off. . |
| 0204133 | 12/1986 | European Pat. Off. . |
| 1554789 | 1/1970 | Fed. Rep. of Germany . |
| 2027514 | 10/1970 | Fed. Rep. of Germany . |
| 1779120 | 1/1972 | Fed. Rep. of Germany . |
| 2125496 | 9/1972 | France . |
| 7205125 | 9/1972 | France . |
| 2620646 | 3/1989 | France . |
| 8812133 | 3/1989 | France . |
| 56-5746 | 1/1984 | Japan . |
| 58-65639 | 4/1984 | Japan . |
| 59-179324 | 4/1984 | Japan . |
| 62-278008 | 12/1987 | Japan . |
| 888448 | 1/1962 | United Kingdom . |
| 1561589 | 2/1980 | United Kingdom . |
| 2116903 | 10/1983 | United Kingdom . |
| 2172240 | 9/1986 | United Kingdom . |
| 2209990 | 6/1989 | United Kingdom . |

OTHER PUBLICATIONS

Product Pamphlet of Komatsu (related to U.S. Pat. No. 4,846,651).

*Primary Examiner*—Jill L. Heitbrink
*Attorney, Agent, or Firm*—Kenyon & Kenyon

[57] ABSTRACT

A system of injection molding by an injection machine with a mold includes conventional fundamental steps including a material plasticizing and metering step, a material injecting step and a material pressure-holding step, but with an additional feature in that nozzle passage is interrupted midway therealong from communication between the interior of a machine body and a mold cavity, after the injecting step but while the material pressure-holding step is being carried out. The material pressure-holding step is carried out first using the injection machine per se operated with a plunger to exert a first non-stepped external or internal pressure on the entire injected material but second using another mechanism for exerting a second non-stepped or stepped internal pressure on a forward portion of the injected material separated due to the nozzle passage interruption.

17 Claims, 13 Drawing Sheets

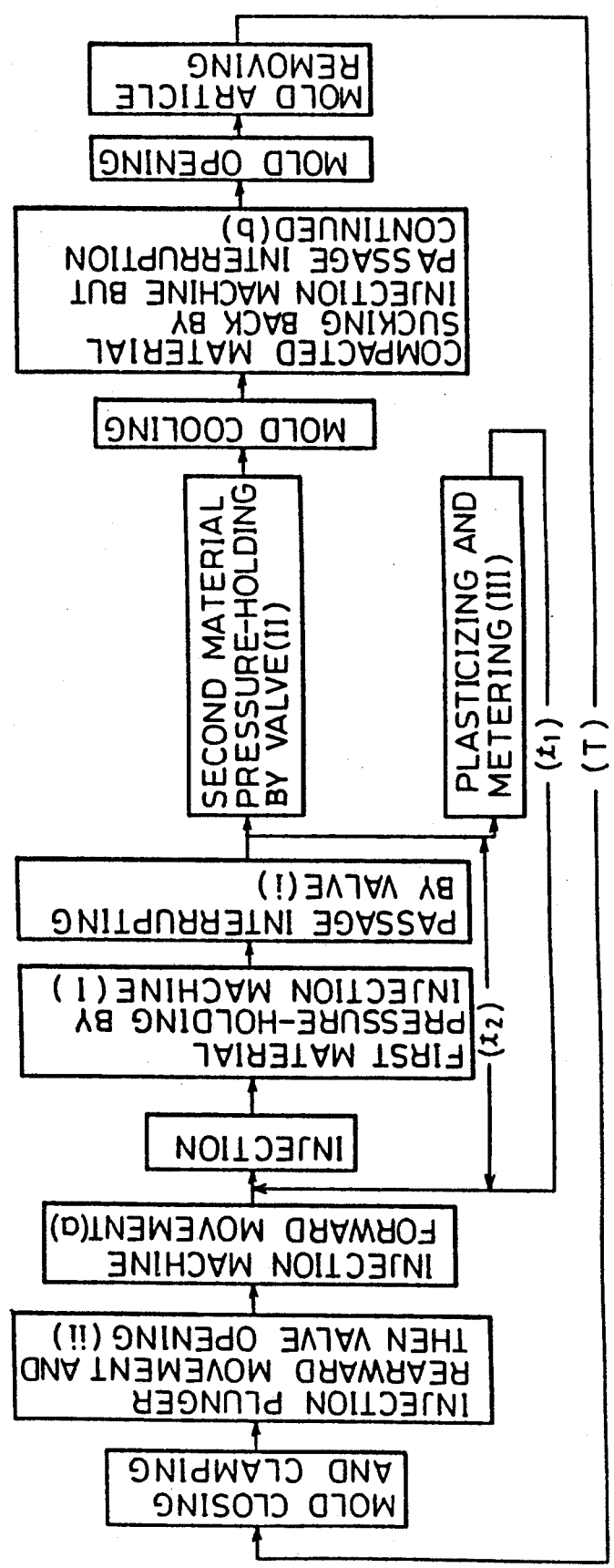
Fig. 6
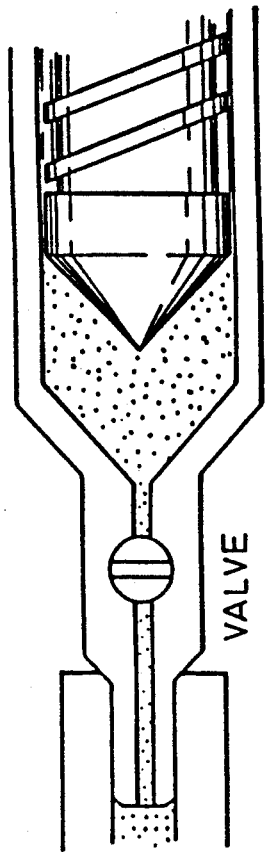
VALVE (INVENTION: Fig.1 or 2)

IMPROVED PRESSURE-HOLDING CHAMBER TYPE INJECTION MOLDING PROCESS AND APPARATUS FOR INJECTION MOLDING OF PRODUCTS

FIELD OF THE INVENTION

The present invention relates to an improved process and apparatus for injection molding of plastic materials, particularly preferable in injection molding of precision products.

BACKGROUND OF THE INVENTION

According to the prior art, an apparatus for injection molding of plastic material comprises an injection machine of a screw plunger type and a mold arrangement defining a mold cavity where a molded article is formed. The mold arrangement may be a single mold for a molded product or consist of a primary mold for a molded product and a cold runner mold for a runner. In place of the cold runner mold, the apparatus may be provided with a hot runner mold incorporated with a manifold between the single mold and the injection machine. A nozzle passage is formed between the mold arrangement and a body of the injection machine, by a nozzle, in the most simple one cavity case or a hot runner mold arrangement and the nozzle.

With such an apparatus, a conventional injection molding process comprises steps of:

having a plastic material, in every shot cycle, plasticized and metered while being heated within the machine body;

having the hot plasticized material injected under pressure for the mold cavity through the nozzle passage;

having the hot injected material held at least partially within the entire mold cavity under pressure while the mold arrangement is being cooled to thereby provide and freeze a molded article therein; and having the frozen molded article removed from the mold cavity after the mold arrangement is opened.

For example, particular steps of injection molding are indicated in Table I or II attached hereto including the above fundamental steps.

Among the important factors influencing the quality of a molded product, it has been recognized that the material pressure-holding step is one of the most critical steps. If this step is not carried out in a suitable manner, the molded products have undesired shrinkages due to short shot and/or flashes due to over-packing.

The time of the material pressure-holding step depends on the time needed for cooling a molded article in the mold cavity.

With a fixed mold cooling capability and a fixed volume of the mold cavity, a thinner molded article takes a shorter time than a thicker molded article to freeze it enough for removal from the mold cavity. In this connection, the thicker molded article requires more time in the material pressure-holding step, although the injecting step and the plasticizing and metering step each take the same time as for the thinner molded article.

According to the prior art, the material pressure-holding step is carried out using the injection machine with the plunger exerting an external holding pressure, subsequent to an injection pressure, on the injected material in a combination of the mold cavity and the nozzle passage against the mold cavity. The conventional technology involves a external holding pressure exerted by the injection machine being controlled to form a multi-stepped pressure, rather than a non-stepped pressure, which is stepped at predetermined strokes of the plunger.

Since a function and effect of the material pressure-holding has not yet been precisely known, although there are some theories which have been developed, there have been various attempts to improve the material pressure-holding step for a plasticized material which is viscid and elastic in the multi-stepped external pressure approach. In the conventional approach, as matter of course, there is a serious difficulty in controlling such a multi-stepped pressure stepped in an accurate manner at predetermined precise stroke positions, since a time between the neighboring steps of the pressure is very short on the order of 0.01 second and with a very short distance between the strokes at the neighboring pressure steps being on the order of 0.1 mm, while an inner diameter of a barrel of the injection machine body is very large relative to such a small stroke difference. Under these circumstances the multi-stepped pressure control cannot rely on a manual operation. Therefore, the recent injection machines for producing precise products, particularly small size articles, are all equipped with an expensive computer incorporated with expensive electronic detectors for the controlled parameters. In connection with the above, such a computer is also used for controlling the plasticizing and metering step and the injection step. In the injection step, there is also adopted a multi-stepped injection method involving a multi-stepped injection speed in most of the cases.

Further, it should be noted that only after the material pressure-holding step in a shot cycle is completed, can the plasticizing and metering step be carried out for a next shot cycle. This is because the injection plunger of the machine per se is essentially engaged in said material pressure-holding step. This means that the plasticizing and metering step is allowed to take a time from the completion of the material pressure-holding step to the time when the mold arrangement is opened for removing a molded article. This time is relatively short in a shot cycle period of time, for example 4.6 sec. (34%) in the shot cycle of 14.50 sec. as indicated in Table I, while the time of the material pressure-holding step takes 5.09 sec. (35%).

The shot cycle time (14.50 sec.) is a sum of the plasticizing and metering time (4.6 sec.), the material pressure-holding time (5.09 sec.) and the other steps (5.41 sec.).

There is, of course, a strong demand for a higher productivity of a precision article due to a shorter shot cycle time in the plastic injection molding industry. This demand, therefore, forces, in one way, the period of time of the material pressure-holding step to be shortened, while ensuring that the quality of molded precision article is still good. This causes not only the mold cooling capability to be improved but also the computer control of the multi-stepped holding pressure and injection pressure with the associated piston strokes to be improved with higher accuracy to harmonize with the improved mold cooling, with the result that the computer control per se is obliged to be a more sophisticated or complicated one with a higher cost incurred in computer equipment. At the present time, the following statement is by no means an exaggeration. The cost of the computer occupies a large part of the cost incurred in production of the injection machine with the result that recent machine production has become very expensive compared with the cost of the original simple injection machine used in the past, which was equipped with no computer and ran by a simple operation involving "a non-stepped pressure and a non-stepped injection speed." This naturally leads to a higher cost incurred in producing molded articles.

In the other ways, in order to reduce the production cost, various efforts to shorten the shot cycle time, of course, have been made in the industry. Such a shortened cycle time forces the time of the plasticizing and metering step to be shortened under the conventional circumstances. However, a serious problem is encountered in that shortening of the plasticizing and metering step requires an increase in the plasticizing rate or performance with an increased power supply, leading to an increased machine cost and operation cost.

Further, it should be noted that such an increased plasticizing capability of the injection machine causes the plastic material per se to be damaged by the screw plunger due to breakage of chains of a high resin polymer, while the polymeric material is being plasticized. This leads to deterioration of a molded article.

Still further, the increased plasticizing capability requires the material to be heated to a higher temperature. This leads to prolongation of the time required to cool the molded article in the mold, and thus the enhanced heating works against the attempt to shorten the shot cycle time. Due to this lower quality of the plasticized material and an enhanced heating, therefore, in combination, there is a certain limitation of enlarging the plasticizing capability, even if the increased cost incurred in production of such a higher performance injection machine is neglected.

Under the circumstances, the inventor recognizes that the improvement or development of the process and apparatus for injection molding of a plastic material in the conventional art is reaching or has reached the limit.

SUMMARY OF THE INVENTION

An object of the present invention is to provide a process and apparatus for injection molding improved not in the above mentioned direction but a new direction, which can be expected to allow injection molding technology to further develop or exceed the limits of the conventional technology.

Another object of the present invention is to provide a process and apparatus for injection molding, using a conventional type injection machine but without being equipped with any material computer, which machine can operate with a non-stepped pressure and a non-stepped plunger speed depending thereon for each of the injection step and the subsequent material pressure-holding step just like those of the original injection machine, a so called "one pressure and one speed approach", but improved in that:

a shot cycle time is considerably shortened with a fixed plasticizing capability of the injection machine; and a plasticizing capability of the machine is considerably reduced with a fixed shot cycle time, while a high quality of precision molded articles as a result of no "short shot" leading to shrinkage and no "over-pack" leading to flashes, is ensured.

A still further object of the present invention is to provide a process and apparatus for injection molding of precision molded articles improved in that a precise adjustment of the material pressure-holding can be made manually without using any computer A still further object of the present invention is to provide a less expensive, simple small scale and/or lower plasticizing powered injection machine having a smaller plasticizing screw plunger irrespective of usage of a computer, incorporated with a mold arrangement of a relatively large scale subjected to a relatively large mold clamping power but enabling production of precision molded products with a high productivity and high quality.

According to the present invention, a process of injection molding is provided comprising the fundamental steps mentioned above for the conventional injection molding process, but with a additional feature in that the nozzle passage is interrupted midway therealong from communication between the interior of the machine body and the mold cavity, after the injection step but while the material pressure-holding step is being carried out.

This featured idea defines a new direction in injection molding technology completely different from the above mentioned conventional one. The idea surpasses the inherent idea or common belief that the material pressure-holding step must rely on the injection machine in connection with the immediately proceeding injection thereby.

According to the present invention, the material pressure-holding step is carried out:

first using the injection machine per se operated with the plunger to exert a first pressure on the entire injected material;

but second using another means for exerting a second pressure on a forward portion of the injected material separated due to the above mentioned nozzle passage interruption.

According to the present invention, the conventional steps of plasticizing, metering and injecting are carried out by a conventional single barrel type or double barrel type injection machine, and the first material pressure-holding substep is carried out by the same conventional injection machine.

In one aspect of the present invention, the first holding pressure is a stepped or non-stepped external static pressure exerted by the injection plunger moving axially as the injected material, as a whole, is shrunk while the mold arrangement is being cooled, and the second holding pressure is a non-stepped internal static pressure exerted by the forward material portion thereon compacted in a fixed closed space consisting of a combination of the mold cavity and a forward part of the nozzle passage defined by the other means.

According to a second aspect of the present invention, the first holding pressure is the same as that of the first aspect, but the second holding pressure is a stepped internal static pressure exerted by the forward material part thereon compacted in a closed space consisting of the mold cavity and a forward part of the nozzle passage defined by the other means, the volume of which space is changed by the other means by steps but is fixed until a next stepped change is effected.

According to a third aspect of the present invention, the first holding pressure is an internal static pressure exerted by the entire injected material thereon compacted in a fixed closed space comprising of a combination of the mold cavity and the entire nozzle passage having a rear end defined by the injection plunger, and the second holding pressure is the same internal static pressure as that of the first aspect.

According to a fourth aspect of the present invention, the first holding pressure is the same as that of the first aspect, but the second holding pressure is a stepped external pressure exerted by the other means on the entire injected material in a closed space changeable in volume due to the other means consisting of a combination of the mold cavity and a forward part of the nozzle passage defined by the other means.

Herein, the word "external pressure" indicates a pressure exerted on a material by an external means, while the word "internal pressure" indicates a pressure exerted on a material by itself. The external means exerting the external pressure is movable in a direction thereof against the material contained in a space closed thereby and changeable in volume due to its movement, while the material exerting the internal pressure is contained in a fixed closed space. In this connection, the external pressure is constant irrespective of material's temperature being changed by heating or cooling, while the internal pressure is varied as the temperature is changed.

Preferably, the closed space packed with the forward injected material portion is designed to have a volume to such an extent that the volume is substantially the same as that of the mold cavity.

The other means is provided to interrupt the nozzle passage midway therealong from communication between the interior of the machine body and the mold cavity and to exert the second holding pressure on the forward injected material portion separated by the nozzle passage interruption. Preferably, the other means in the first and third aspects of the invention may form a valve means incorporated with the nozzle passage. Alternatively, the passage interrupting and pressure exerting means forms a piston-cylinder having plunger to communicate with the nozzle passage for the plunger to move through a local part midway along the nozzle passage toward the mold cavity over a predetermined stroke under pressure against a forward portion of the injected material and be fixed temporarily at said stroke to thereby interrupt the communication between the interior of the machine body and the mold cavity midway along the nozzle passage and also define said fixed closed space with the compacted material therein. The piston-cylinder has a straight cylindrical hollow extension in which the plunger is slidably fitted and movable along the hollow extension. The nozzle passage partially forms a forward portion of the straight hollow extension to thereby have the plunger cause the nozzle passage interruption when the plunger enters the forward straight hollow extension portion. Another part of the nozzle passage leading to the machine body and following the forward straight hollow extension part is branched and extends from straight hollow extension.

The above valve functioning piston-cylinder means is also used as the other means in the third aspect of the invention. In this case, the piston is forced to move forwardly step by step so that the stepped internal pressure is exerted by the compacted material.

According to the present invention, the injection molding process further comprises a step of sucking back the hot material remaining in the forward passage part due to expansion of volume thereof, before the mold arrangement is opened for removing the molded article but while said nozzle passage interruption is maintained, to thereby release the hot material from the excessive packing.

With the piston-cylinder provided, the expansion of the nozzle passage expansion is effected by a rearward movement of the plunger. With the valve means provided, a section of the nozzle passage is formed by a forward cylinder part and a bored rear piston part provided with the valve means and movable into the cylinder part.

A forward end of the hot material remaining in the nozzle passage following the molded article is frozen by cooling the mold. The frozen or cold forward material end is melted by instantaneous heat being temporarily applied after the sucking back step is completed but just before a next shot.

The instantaneous heating is preferably effected by a means invented by the inventor in the past i.e., a so called "Spear System". The sucking back process or means is particularly necessary in a case where the shot cycle time is short and thus the mold cooling time is short. This is because the cold material end is not frozen enough to resist the internal pressure in the forward nozzle part with the result, if the sucking back is not effected to reduce the pressure that the material is likely to leak out with the insufficiently frozen material end.

The nozzle passage interruption is released to have the mold cavity communicate with the interior of the machine body for the next shot, before the cold forward material end melts. In a stationary state, the hot plasticized material injected in an immediately preceding shot cycle, other than a resultant molded article, remaining in the injection machine including the entire nozzle passage is injected for the mold cavity together with a following fresh metered plasticized material through the entire nozzle passage upon melting of the cold forward material end following the release from said nozzle passage interruption. The amount of the fresh metered material being substantially equivalent to that of the molded article.

With the valve means incorporated with the nozzle passage in the first or third aspect of the invention, the forward nozzle passage part defined in the fixed closed space is a forward part separated due to the nozzle passage interruption. The first external or internal pressure by the injection plunger at the end of the first material pressure-holding substep is substantially equivalent to the internal pressure by said compacted material at the beginning of the second material internal pressure-holding substep.

With the piston-cylinder incorporated with the nozzle passage, in the first or second aspect of the invention, the forward nozzle passage part defined in the fixed closed space is smaller than a forward part separated due to the nozzle passage interruption by a predetermined volume. The external pressure exerted by the injection plunger at the end of the first material external pressure-holding substep is smaller than the internal pressure exerted by the compacted material at the beginning of the second material internal pressure-holding substep by an increased portion of the compression pressure due to the material compressed by the predetermined volume to form the compacted material.

The nozzle passage may form a hot runner mold incorporated with a manifold having a sprue inlet to which the nozzle is attached. The mold arrangement may be provided to form a primary mold for providing a molded product and a cold runner mold for providing a molded runner. The molded product and the molded runner in combination forming said molded article in the mold cavity.

The inventor has named the above mentioned forward nozzle passage part, either fixed or changing in volume by steps, incorporated with the other means, a "material pressure-holding chamber", and also named the process and apparatus for the present invention as "injection molding system incorporated with a material pressure-holding chamber", for convenience in identifying the invention using this new approach different from the conventional one.

According to the present invention, the time period of said second material pressure-holding substep comprises a predominant part of the overall time period of said material pressure-holding step. Preferably, the nozzle passage interruption is effected upon said injection. A dynamic injection pressure exerted on the material during high speed flowing toward the mold cavity through the entire nozzle passage is stepped down from a high level to a lower level to change into a static holding pressure in the first and second aspects of the invention, but the static holding pressure is interrupted from being exerted on the entire injected material upon the nozzle passage interruption effected immediately after completion of the injection.

The first holding pressure and the injection pressure are preferably non-stepped pressures, but they may be, of course multi-stepped pressures as needed.

According to the present invention, upon the nozzle passage interruption, the plasticizing and metering step is carried out by the injection machine for a next shot or injection. In this connection, the plasticizing and metering step can be carried out at a relatively low rate at the longest over a relatively long period of time substantially equivalent to that from the time just after a first injection to the time when the mold arrangement is closed for a second injection, the time of said longest step being almost equivalent to a shot cycle period of time from the first injection to the second injection.

This is one of the most advantageous features of the present invention which can never be attained by the prior art in using conventional approach where the material pressure-holding step relies on the injection machine. The above advantageous feature enables the time of the plasticizing and metering step to be prolonged, for example, from 3.5 sec. to 8.5 sec. as shown in Table I, in a fixed shot cycle time of 14.59 with the effect that the injection machine can be designed to operate at a lower plasticizing rate, for example about 2/5 (3.5/8.5) of the conventional machine, a much smaller size machine which consumes less power can be employed, and also the L/D ratio of the screw plunger is allowed to be larger. Further, with an injection machine having a fixed plasticizing rate, the shot cycle time is considerably decreased, for example to an extent of about 65% (9.59/14.59) of the conventional one as indicated in Table I.

Another important advantage of the present invention is attained by using the internal holding pressure, particularly at the second material pressure-holding substep, which is continuously and automatically decreased as a temperature of the material held in the entire mold cavity is decreased due to cooling of the mold arrangement, to thereby form a cold molded article.

With an appropriate initial internal pressure selected, the molded article is obtained with no local shrinkage and flashes, without using any control of the holding pressure.

Generally speaking, this means that a computer is no longer needed for controlling the holding pressure, since the second substep is a predominant part of the overall time of the material pressure-holding step. Further a computer is no longer needed for controlling the holding pressure at the first substep because the time of the first substep is very short, in other words, the present invention does not rely substantially on the injection machine for carrying out the material pressure-holding step.

In connection with the above, the present invention is also advantageous in that the internal holding pressure for the material pressure-holding is adjusted accurately to a desired level by a simple manual operation changing the stroke along a scale provided. This is because the piston-cylinder is designed to have a large ratio of L/D. In marked contrast, the ratio of L/D of the injection machine is considerably small and is not allowed to be larger as desired with the result that the conventional material pressure-holding step requires a computer with an electronic means for accurately detecting the position of the injection plunger stroke.

The second material pressure-holding substep effected upon the nozzle passage interruption may, of course, be carried out using a piston-cylinder exerting an external static pressure on the compacted material just like the first substep carried out by the injection machine having a piston-cylinder with an injection plunger exerting an external static pressure on the entire injected material. However, this may require the use of a computer just as in the injection machine in some cases.

BRIEF DESCRIPTION OF DRAWINGS

FIGS. 6 and 7 show a flow or process chart and the piston-cylinder means of FIG. 3 in combination and another flow chart and the valve means of FIG. 1 in combination, indicating time series of injection molding processes in a shot cycle, respectively;

DETAILED DESCRIPTION

Figure 1:
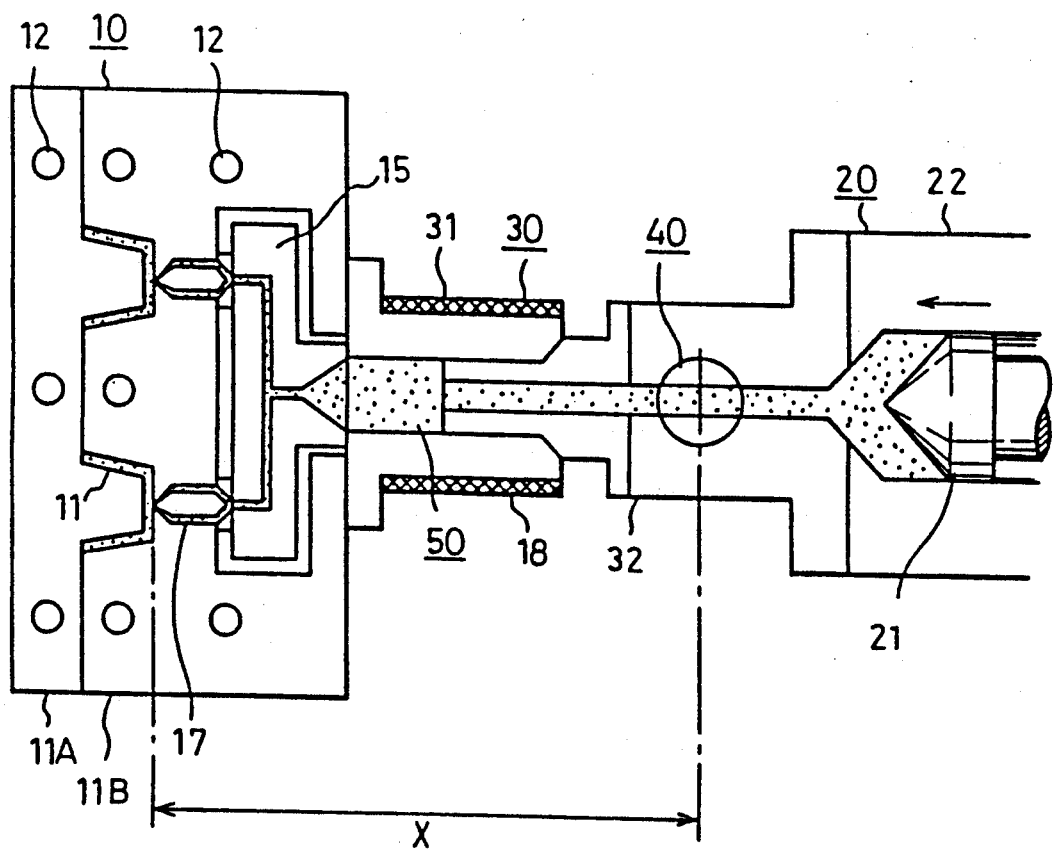
FIGS. 1 and 2 show an injection molding apparatus according to the present invention incorporated with a mold arrangement and provided therein with a means forming a valve for carrying out a latter part of a material pressure-holding step, respectively.

FIGS. 1, 2, 3, 4, 5, 13, and 14, show three kinds of embodiments of an injection molding apparatus according to the present invention.

The apparatus for injection molding is incorporated with a mold arrangement 10 having mold halves 11A, 11B defining at least one cavity 11 having a gate, and comprises an injection machine 20, 20' having a single barrel type body of a piston-cylinder provided with an injection plunger 21, 23'B therein and a hollow extension 30, 30' therefrom including a nozzle and forming a nozzle passage 50, 50' communicating between the interior of the machine body 22 and the mold cavity 11. The machine is provided for having a plastic material plasticized and metered within the machine body 22, 22'A while the machine body 22, 22'A is being heated, and having the hot plasticized material injected for the mold cavity 11 through the nozzle passage 50, 50' and having the injected material at least partially held within the entire mold cavity 11 under pressure. The mold halves 11A, 11B are provided with means 12 for cooling the mold arrangement 10.

According to the present invention, there is provided a means for interrupting the nozzle passage 50, 50' midway therealong from communicating between the interior of the machine body 50, 21'B and the mold cavity 11 and providing a fixed closed space X of a combination of the mold cavity 11 and a predetermined forward part of the nozzle passage 50, 50' communicating therewith with a predetermined portion of the injected material separated due to the nozzle passage interruption compacted therein to thereby have the compacted material exert an internal pressure to urge itself against the mold cavity 11.

According to a first embodied apparatus of the present invention, the passage interrupting and internal pressure exerting means forms a valve 40 provided in the nozzle passage 50. In second and third embodiments, the means form a piston-cylinder 60 and a valve 40', respectively.

Figure 2:
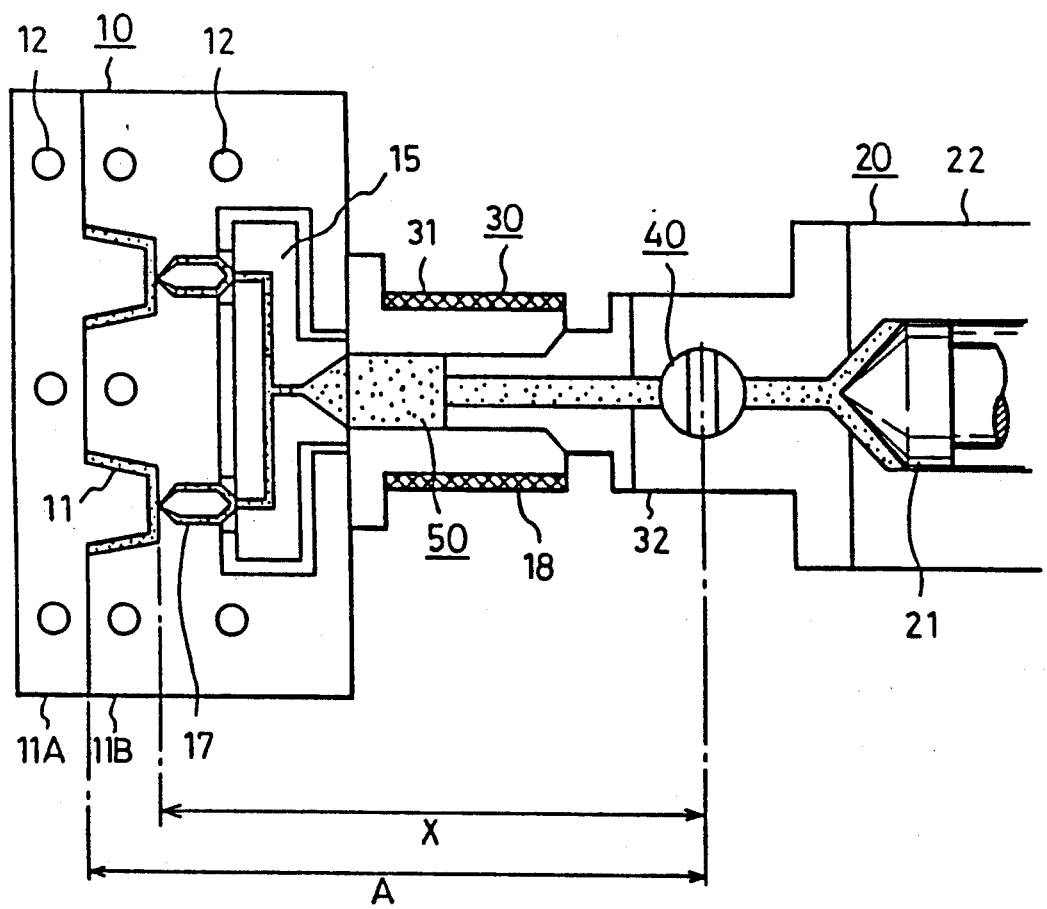

Regarding FIGS. 1 and 2, the first embodied molding apparatus 20 of the present invention is a conventional single barrel type injection machine of a screw plunger type and incorporated with a conventional mold arrangement 10 defining a mold cavity 11. A conventional hot runner mold 15 incorporated with a manifold, a bored block 31 and a bored subblock 32 in combination forms a nozzle arrangement having the nozzle passage 50 therein communicating with the interior of a machine body 22 and the mold cavity 11. The main block 31 forms a cylinder coaxial with the injection machine 20 and the subblock 32 forms a bored piston nozzle coaxial with the injection machine 20 being movable into the cylinder with a fixed forward stroke and integrated with the machine body 22. The cylinder is provided with a band heater 18, and defines a forward portion of a nozzle passage section and the piston is provided with a rear portion of the nozzle passage section therein. The subblock 32 is provided with the valve 40 therein to interrupt the nozzle passage from communication between the mold cavity 11 and the interior of the machine body 22.

A combination of the main block 31 and the subblock 32 causes the nozzle passage 50 to axially expand the volume thereof by a rearward movement of the injection machine 20, while the nozzle passage interruption is maintained but before a molded article is removed from the mold cavity 11, with the effect that a forward portion of an injected material, exclusive a molded article, remaining in the forward nozzle passage part is sucked back so that it is released from being pressurized and compacted.

The runner mold 15 is provided with means 17, a so called "Spear System", for instantaneously heating the runner mold at a free forward end of the runner passage when the mold arrangement 10 is closed for an injection operation, while the mold arrangement 10 is being cooled.

Figure 3:
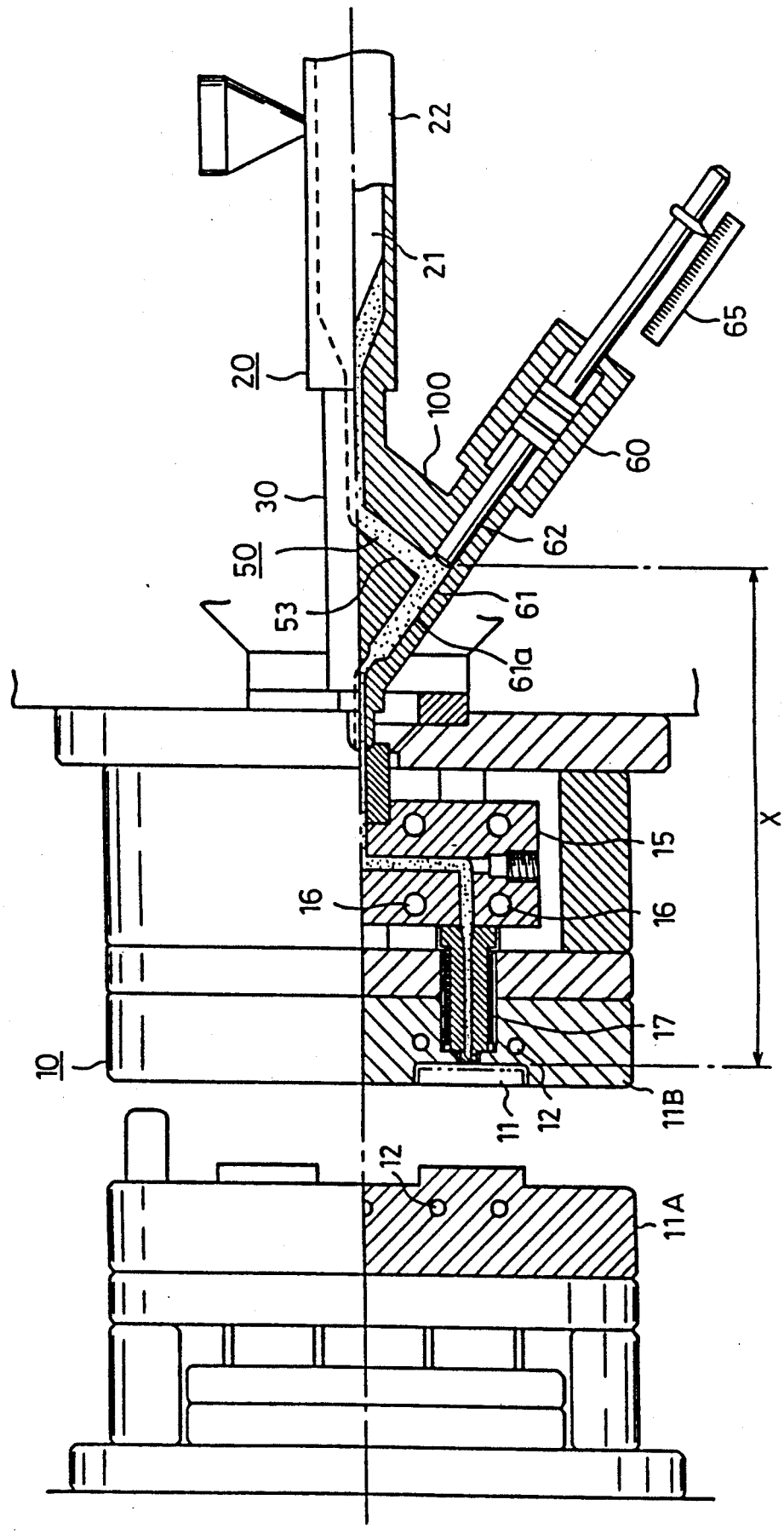
FIG. 3 show an injection molding apparatus according to the present invention incorporated with a mold arrangement and provided therein with a means forming a piston-cylinder for carrying out a latter part of a material pressure-holding step.
Figure 5:
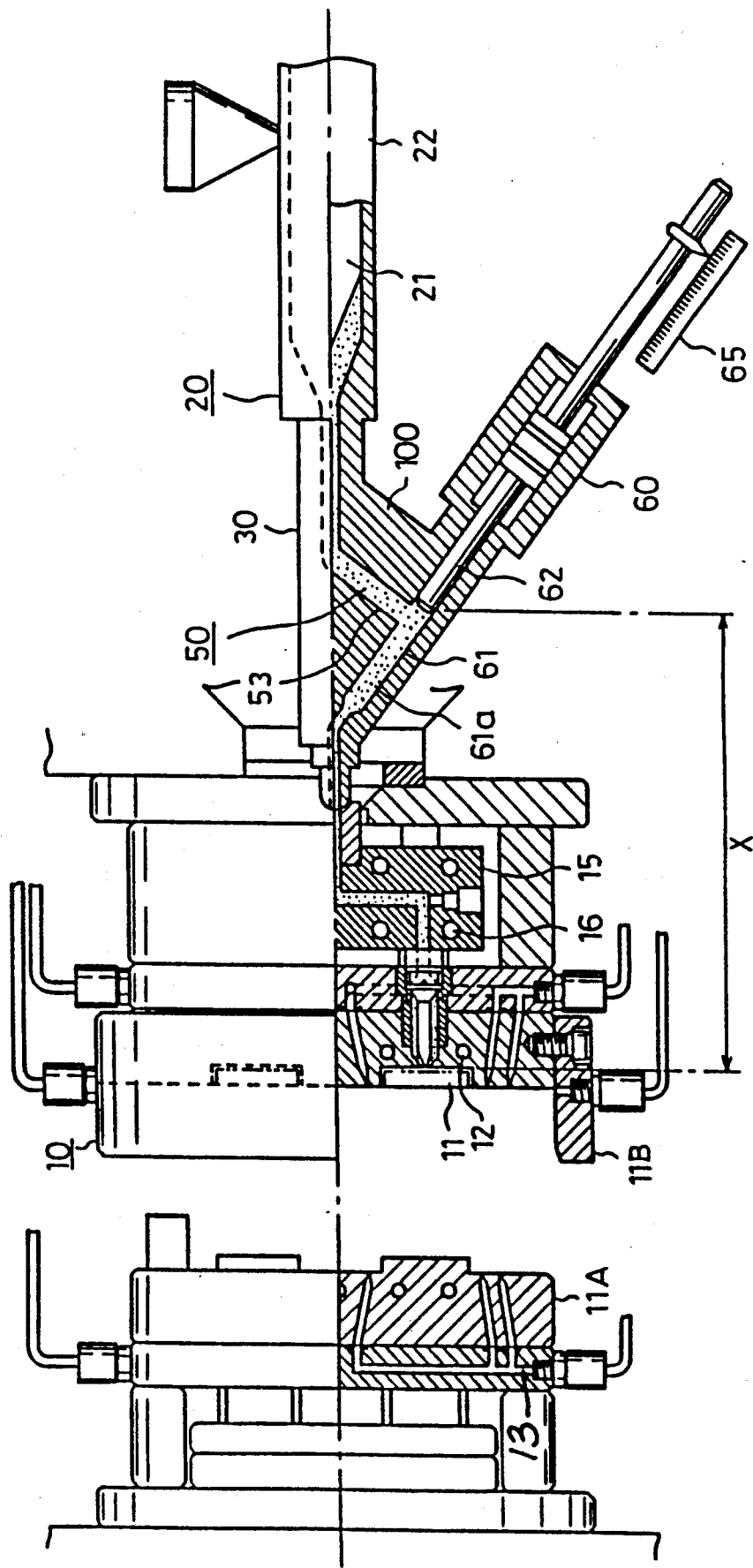
FIG. 5 shows an injection molding apparatus incorporated with a mold arrangement corresponding to that of FIG. 3 but provided therein with gas nozzles for cooling the mold cavity.

The runner mold 15 may be provided with another means 16 such as heating cartridges for heating the runner mold to thereby keep a portion of the injected material remaining in both the runner passage and a sprue hot, while a free end portion of the runner is being frozen with the mold article within the mold cavity by the mold cooling means, as that of the second embodiment shown in FIGS. 3 and 5.

FIGS. 3, 4(a) to 4(c) and 5 show the second embodied injection molding apparatus of the present invention, incorporated with a mold arrangement. The apparatus 20 has the same arrangement as that of the first embodiment except for the material internal pressure-holding means. A block 100 having a heater means and forming the nozzle arrangement is provided with the piston-cylinder 60. The piston-cylinder 60 has a straight cylindrical hollow extension 61 in which its rod plunger 62 is slidably fitted and movable along the hollow extension. The nozzle passage 50 partially forms a forward portion 61a of the straight hollow extension 61.

Figure 4A:
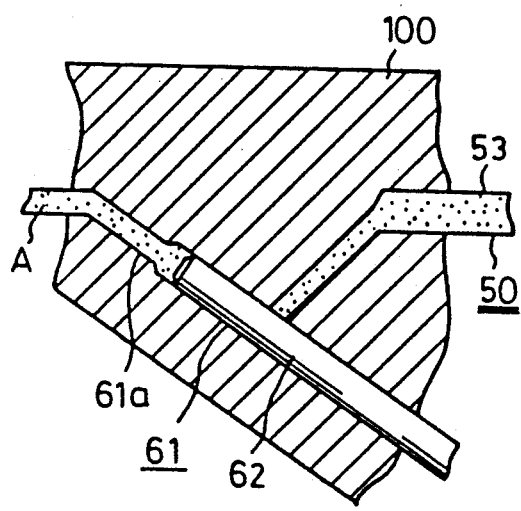
FIGS. 4(a), 4(b) and 4(c) show positions of a plunger provided in the piston-cylinder of FIG. 3 where the material pressure holding substep, a material sucking back step and a proceeding material pressure-holding substep following a material injection step are carried out, respectively.
Figure 4B:
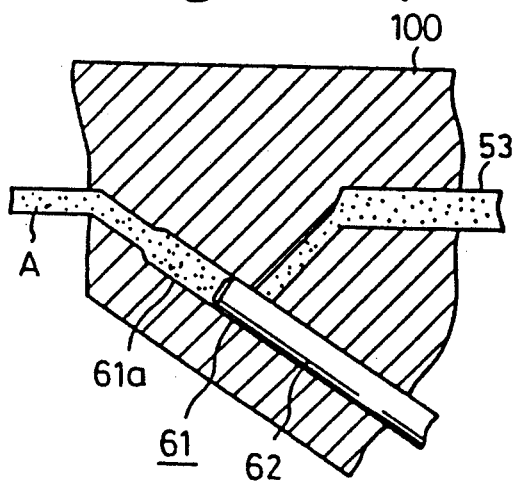
Figure 4C:
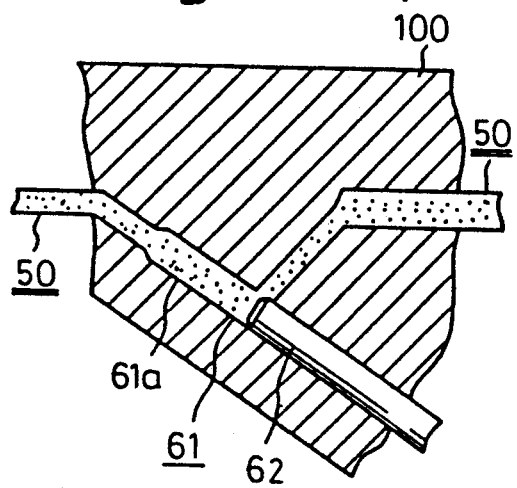

Another part 53 of the nozzle passage 50 leading to the machine body 22 and following the forward straight hollow extension part 61a is branched and extends from the straight hollow extension 61 to thereby have the plunger 62 cause the nozzle passage interruption when the plunger enters the forward straight hollow extension part 61a (FIGS. 4a and 4b). The piston-cylinder 60 is provided also for having the plunger 62 move rearwardly from a forward stroke, while the nozzle passage interruption is maintained but just before the molded article is removed from the mold cavity 11, with the effect that a forward portion A of an injected material remaining in the forward nozzle passage part separated due to the nozzle passage interruption, exclusive a molded article, is sucked back so that it is released from being pressurized and compacted.

The plunger 62 is forced to move further over a predetermined and fixed stroke to thereby have the forward material portion A separated due to the nozzle passage interruption compacted in a combination of the mold cavity 11 and a forward part X of the nozzle passage having a rear end defined by the plunger 62 at the fixed stroke. As a result, the material pressure-holding is effected with a non-stepped internal pressure on the material against the mold cavity (FIG. 4a). Alternatively, the plunger 62 may be forced to move forwardly step by step to thereby have the compacted material A exert a multi-stepped internal pressure on the material against the mold cavity (FIG. 4a).

As shown in FIG. 5, each mold half 11A, 11B may be provided with a means forming a gas nozzle 13 at an inner cavity surface for having gas sprayed on the facing cavity surface of the other mold half from the gas nozzle 13 to thereby effect additional cooling of the mold arrangement 10 at the cavity surface.

Figure 7:
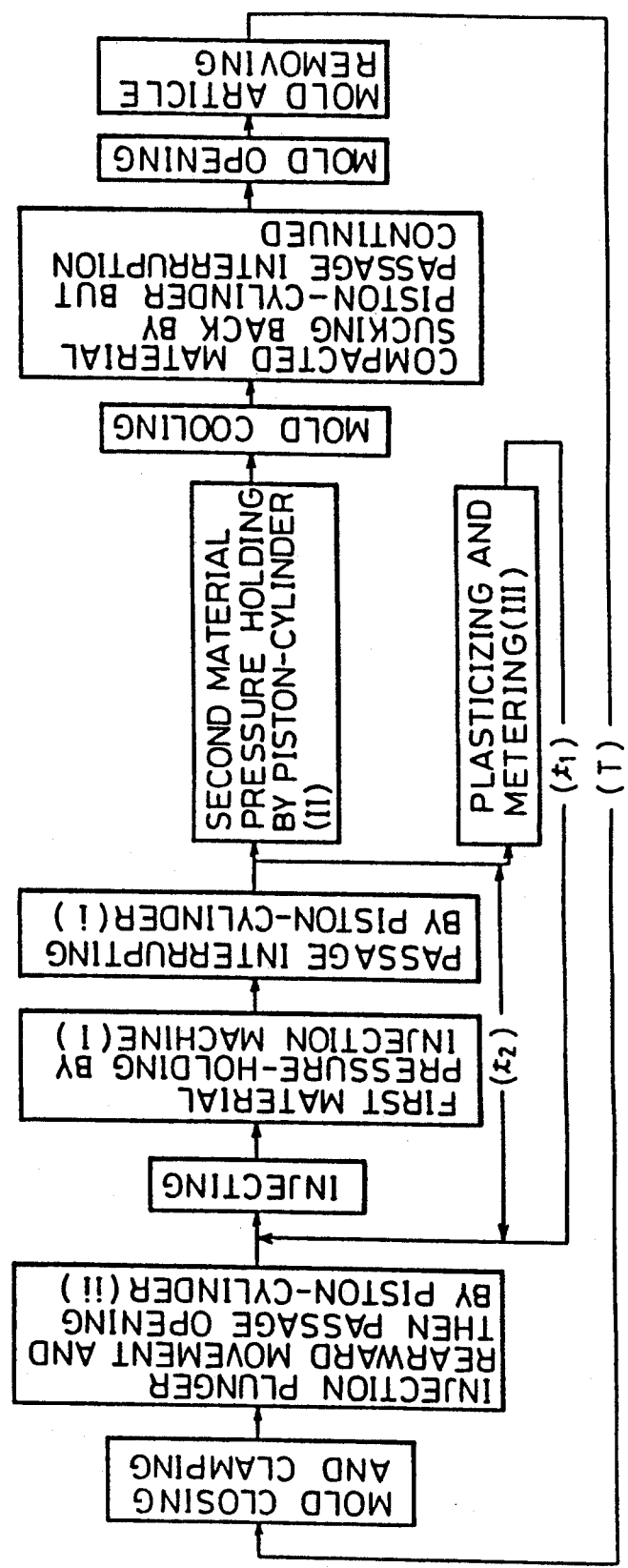

The first and second embodied apparatuses incorporated with the mold arrangements 10 incorporated with the hot runner molds 15 are operated as shown in FIGS. 6 and 7, respectively. That is, according to the present invention, the material pressure-holding step is first carried out by the injection machine 20 exerting a first non-stepped external pressure on the injected material (I), and second, upon the nozzle passage interruption (i) by the valve 40 or the piston-cylinder 60, carried out by the compacted material exerting a second non-stepped or stepped internal pressure (II). Upon the nozzle passage interruption (i), the plasticizing and metering step (III) is carried out for a next shot cycle.

Referring to FIGS. 6 and 7, the nozzle passage interruption (i) is released, that is the nozzle passage 30 is opened (ii) after the mold is closed and clamped but just after the injection plunger 21 is retracted with a rear portion of the injected material separated due to the nozzle passage interruption and a fresh metered plasticized material, in combination, sucked back in the material body 22. The nozzle passage interruption (i) is effected just after the first material external pressure-holding step (I) subsequent to the injection, and is continued until the time just before the mold arrangement 10 is opened for removal of a cold molded article.

The plasticizing and metering step (III) which is commenced upon the nozzle passage interruption (i) can be continued at the longest until the nozzle passage interruption is released, that is the nozzle passage is opened (ii) for a next shot cycle. That is, the plasticizing and metering operation can be continued at the longest by a time ($t_1 = T - t_2$) in a shot cycle time (T), where $t_2$ is a relatively short time from the time when the injection is commenced to the time when the nozzle passage interruption (i) is effected and includes a substantially shorter time of the first material external pressure-holding substep (I) by the injection plunger (21), following the injection.

Tables I and II below show operational steps of injection molding carried out in a shot cycle, each using a conventional injection apparatus and a first embodied injection apparatus (FIG. 1, 2). These apparatuses are incorporated with the same mold arrangement as that for producing plastic VHS half cases (four cases and two cases per unit), respectively.

The conventional apparatus involved in Table II has a nozzle shut-off valve for preventing the material from leaking out of the nozzle, while the first embodied apparatus of the present invention is not provided with such a nozzle shut-off valve. Such leaking is prevented due to a combination of the material frozen at the forward end of the nozzle passage by the mold cooling and the material being sucked back. The other conventional apparatus involved in Table I has no shut-off valve.

With the second embodied apparatus (FIG. 3, 4), substantially the same operational steps can be carried out as those of the first embodied apparatus as indicated in Tables I and II.

Referring to Tables I and II, the plasticizing and metering steps (III) according to the present invention for a next shot cycle are carried out for about 8.5 sec. (Table I) and about 11 sec. (Table II), respectively while the conventional plasticizing and metering steps are carried out for about 3.5 sec. (Table I) and about 4.5 sec. in shot cycle times of 14.59 sec. (Table I) and 13.50 sec. (Table II), respectively.

Resultant molded products have a high quality without flashes and shrinkage.

The above results of the present invention are surprising in comparison with those of the prior art. This is a very advantageous effect of the present invention based on a new idea of a "material pressure-holding chamber molding system", where an internal pressure of a plasticized material is utilized for the material internal pressure-holding upon the nozzle passage interruption, and the plasticizing and metering step is commenced upon the nozzle passage interruption.

The injection machine is smaller in size and/or less powered, and operates at a very reduced plasticizing rate, compared with the conventional injection machine. The effect is obtained without any computer control.

The embodied injection machine of the present invention is provided with no computer for controlling a first external holding pressure and is operated with a non-stepped first external holding pressure for a very short time, and upon the nozzle passage interruption, the second material pressure-holding substep is carried out to have the compacted material exert a second non-stepped or multi-stepped internal pressure without using any computer.

As shown in Table I and II, the conventional injection machine exerts a multi-stepped external pressure for the entire material pressure-holding step using a computer (two stepped pressure in Table I and three stepped pressure in Table II).

With the first or second embodied apparatus, the so called "material pressure-holding chamber" (X) is formed by the nozzle passage 50 including the valve 40 or the piston-cylinder 60, defined between a gate of the mold arrangement 10 and the point where the nozzle passage interruption (i) is effected, denoted by X.

Figure 8:
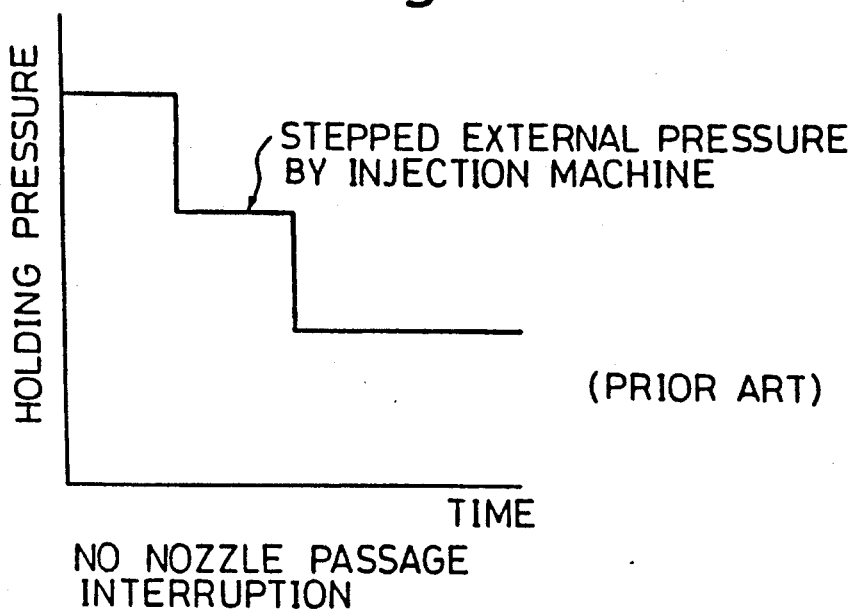
FIGS. 8 to 12 are qualitative diagrams showing holding pressures exerted in the entire material pressure-holding step carried out by a conventional apparatus and the apparatus of the present invention respectively.

Referring to FIG. 8 the external pressure as a holding pressure exerted by the conventional injection machine in the entire material pressure-holding step is decreased in a multi-stepped manner controlled by a computer as the mold arrangement is cooled.

Figure 9:
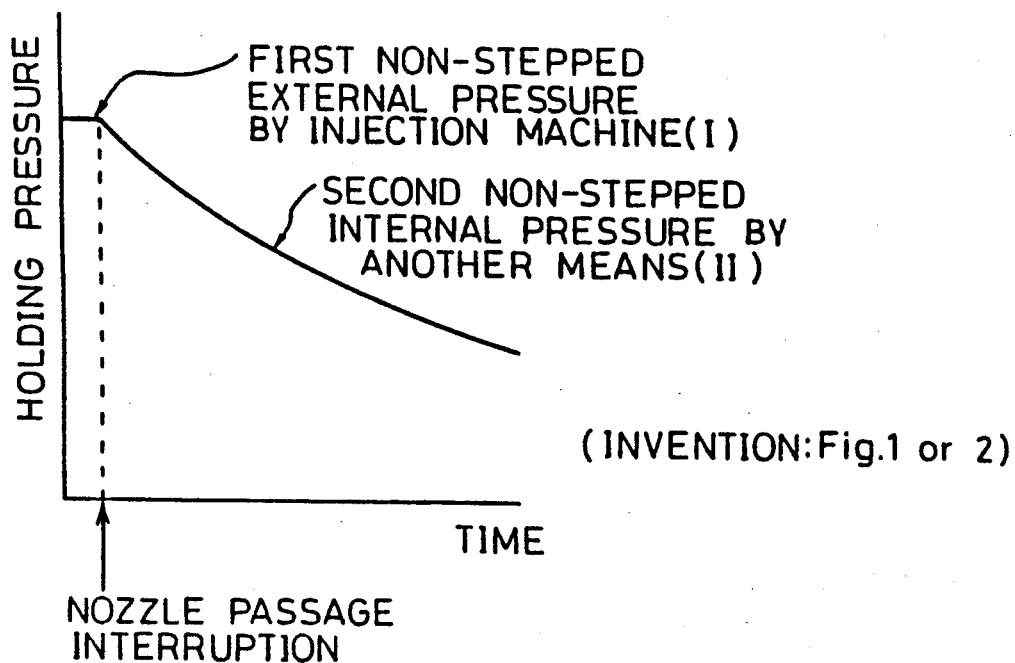
Figure 10:
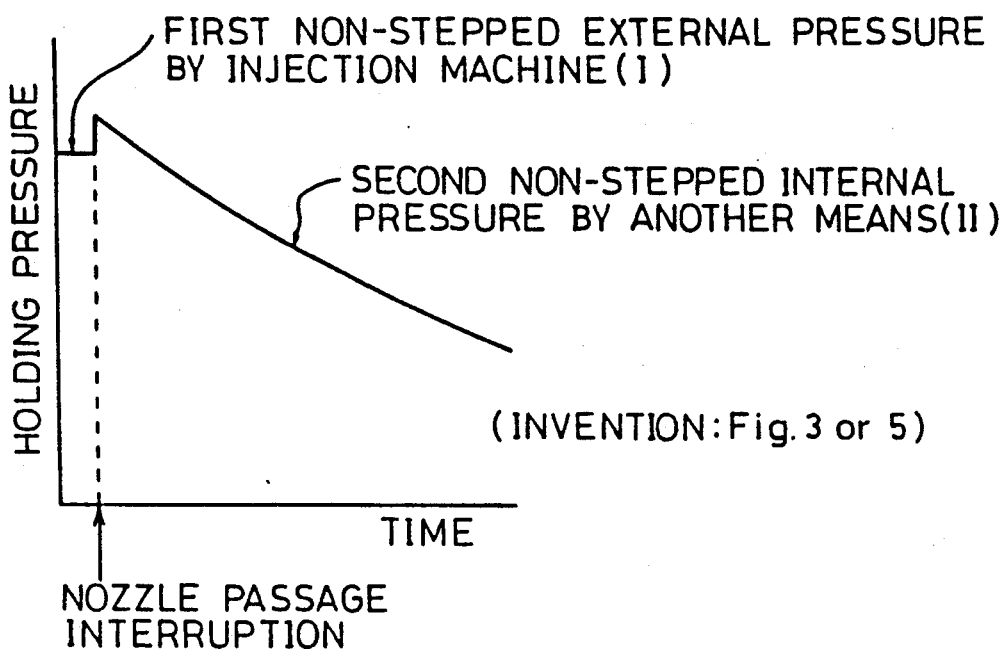
Figure 11:
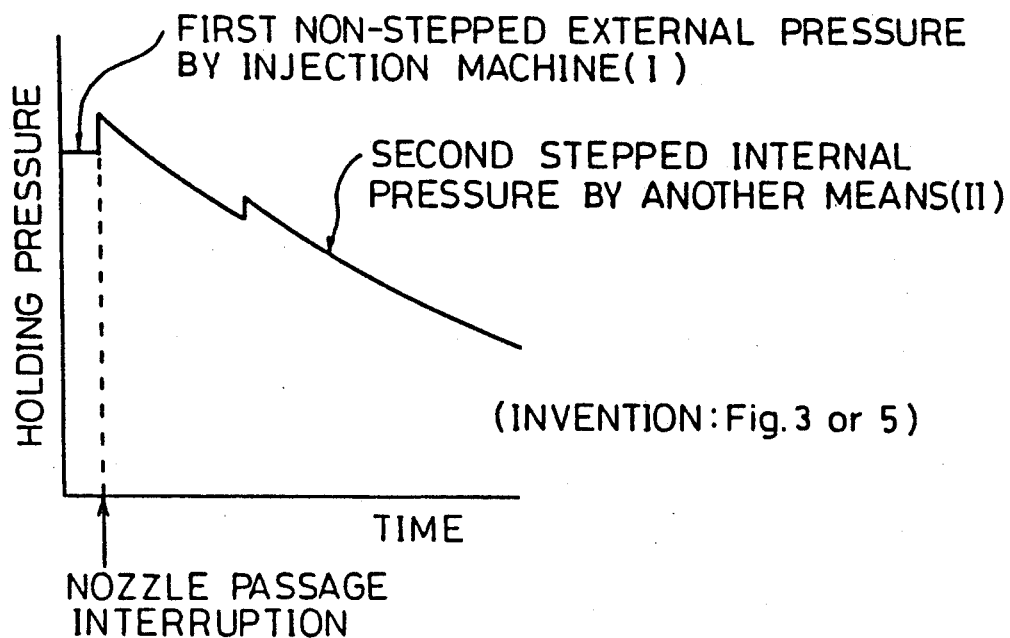

According to the present invention, the material pressure-holding step is divided into a first substep (I) and a second substep (II) due to the nozzle passage interruption (i). (FIGS. 9, 10 and 11). The first substep (I) is carried out by the injection machine and the second substep is carried out by the material pressure-holding chamber. In the first substep (I), a first external holding pressure is exerted by the injection plunger 21 in a non-stepped manner which does not require any computer as shown in FIGS. 9, 10, and 11. With the chamber (X) provided with the valve 40 (FIGS. 1 and 2), a second internal holding pressure exerted by the compacted material is decreased from the first external pressure in a non-stepped manner requiring no computer as the mold arrangement is cooled as shown in FIG. 9.

With the other chamber (X) provided with the piston-cylinder 60 (FIGS. 3 to 5), a second interval holding pressure exerted by the compacted material is decreased in a non-stepped manner as that of FIG. 9 except that, as shown in FIG. 10, an initial internal pressure is larger than the first external pressure exerted by the injection plunger 21, by a portion of the compression pressure increased due to the forward movement of the rod plunger 62 of the piston-cylinder 60 (FIG. 4a).

In this case, no computer is required for the material pressure-holding step.

If the piston-cylinder 60 is operated to have its rod plunger 62 move step by step, a resultant internal pressure is multi-stepped as shown in FIG. 11. In this case, a computer may be preferably used for controlling the stepped internal pressure. However, a sophisticated computer control is not required, since, as shown in FIGS. 3 and 4, a L/D ratio of the plunger 62 is so large that adjustment of the plunger stroke is easily effected even manually using a measure scale 65.

The multi-stepped internal holding pressure as shown in FIG. 10 at the second material pressure-holding substep (II) is exerted by the compacted material A with the plunger 62 being forced to move forwardly step by step from a fixed stroke to another fixed stroke during the mold arrangement cooling.

Figure 15:
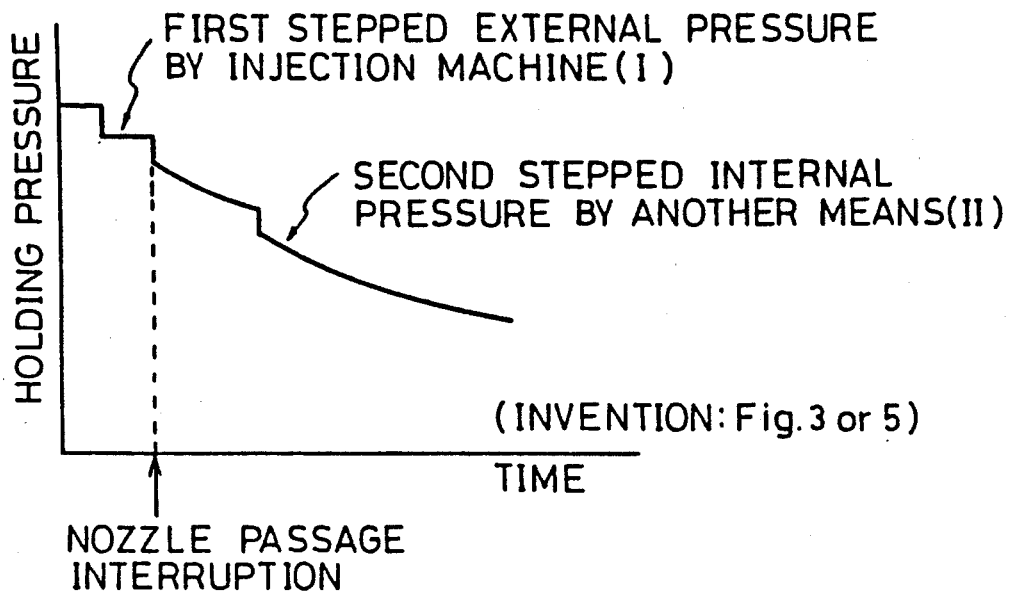

Another multi-stepped internal holding pressure at the second material pressure-holding substep (II) as shown in FIG. 15 is exerted by the compacted material A with the plunger 62 being forced to move rearwardly step by step from a fixed stroke to another fixed stroke during the mold arrangement cooling. In this case, the first holding pressure exerted by the injection machine until the nozzle passage interruption is effected is a conventional stepped external pressure A multi-stepped external holding pressure at the second material pressure-holding substep (II) as shown in FIG. 16 is exerted by the piston-cylinder 60 with the plunger 62 being subjected to a power in such a manner that the power is decreased step by step while the plunger stroke is not fixed during the mold arrangement cooling, just as in a conventional multi-stepped external holding pressure exerted by an injection machine with an injection plunger.

Figure 16:
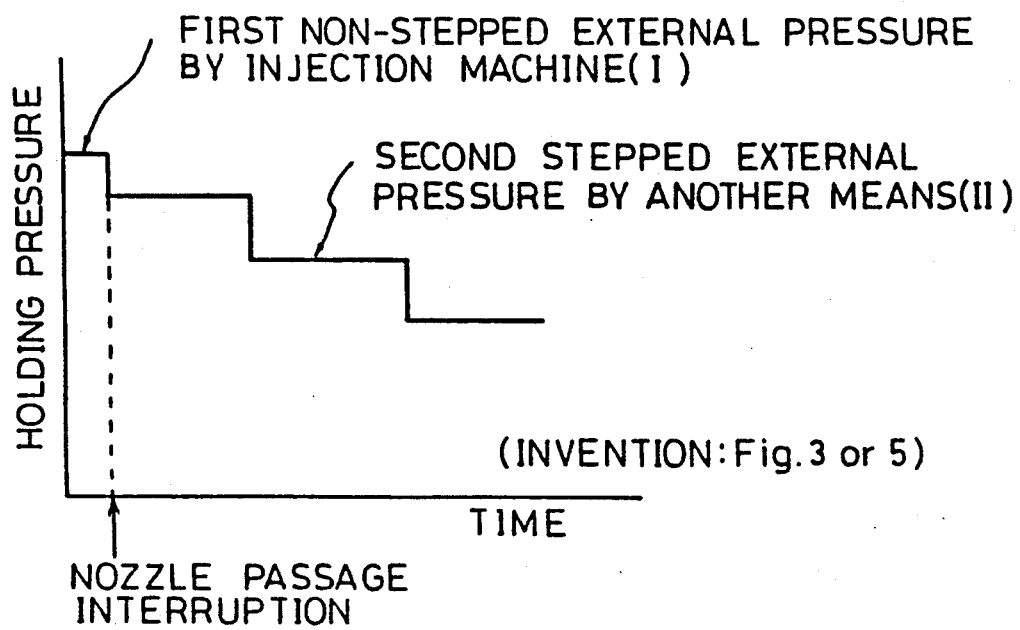

Such a stepped external holding pressure as shown in FIGS. 16 may be preferably controlled by a computer but not so sophisticated a computer for the above mentioned reason, that is a L/D ratio of the plunger 62 of the piston cylinder 60 can be designed so as to be considerably larger relative to that of the injection plunger.

Figure 13:
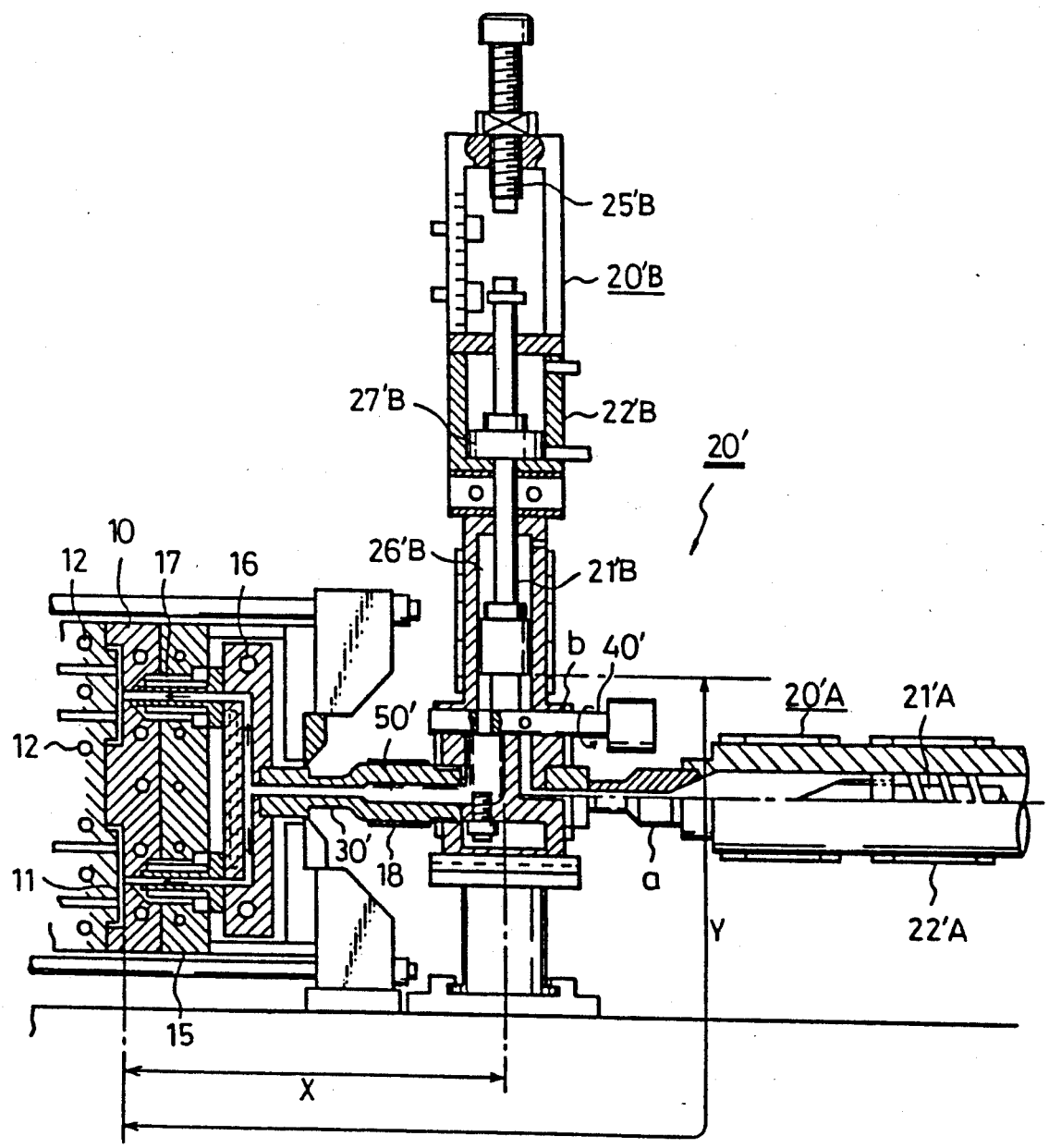
FIGS. 13 and 14 show a two part injection apparatus according to the present invention, and FIGS. 15 and 16 and are qualitative diagrams corresponding to FIGS. 8 to 12 showing some other modes of holding pressures exerted in the entire material pressure-holding step carried out by the apparatus of the present invention, respectively.
Figure 14:
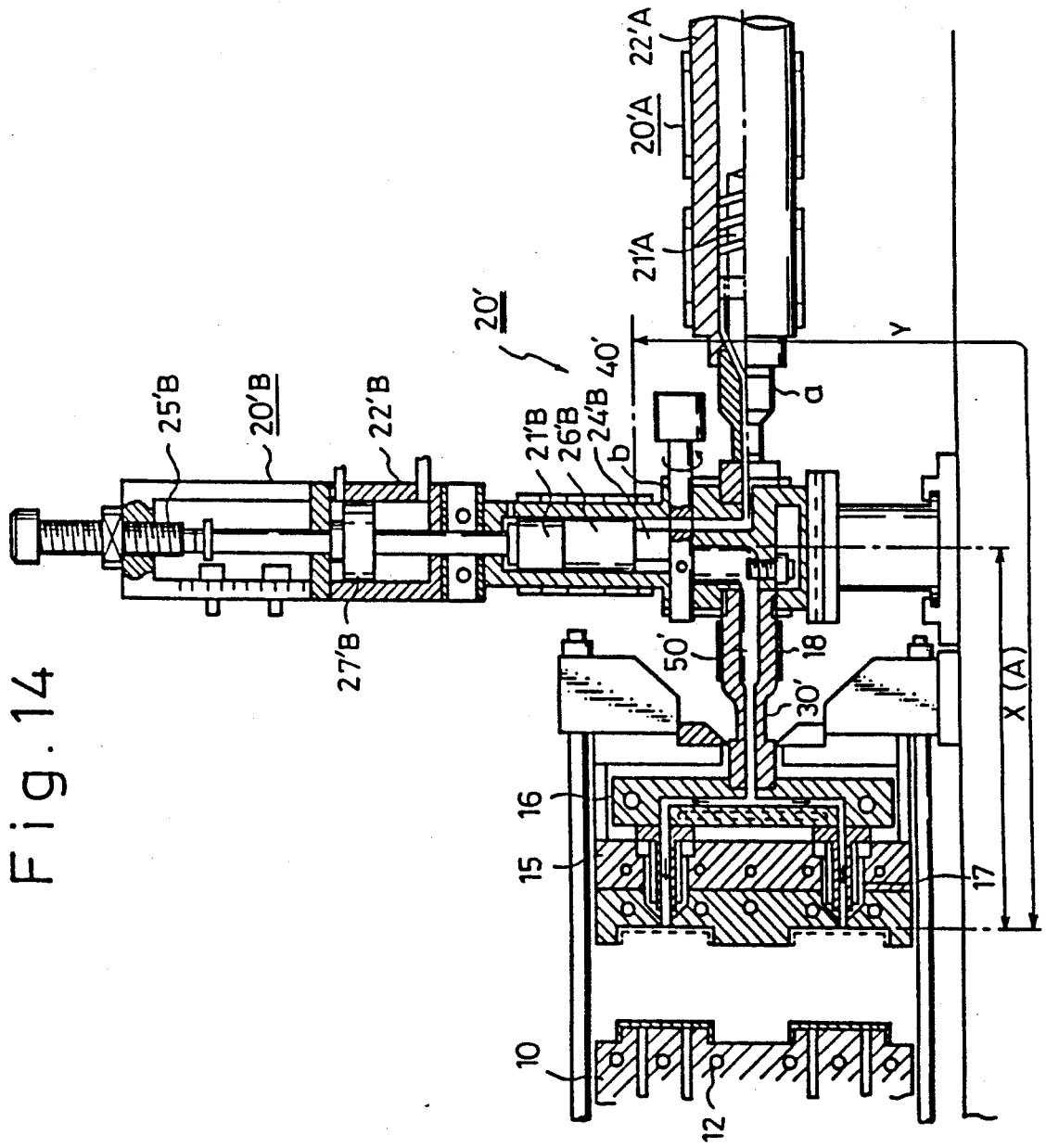

FIGS. 13 and 14 show a third embodied apparatus for injection molding according to the present invention.

An injection machine 20' is divided into a plasticizing machine part 20'A having a front body part 22'A and a metering machine part 20'B having a rear body part 22'B by a value 40'. The metering machine part 20'B communicates with a nozzle passage 50' corresponding to those of FIGS. 1, 2, 3, and 4 with the above mentioned valve 40' corresponding to that of FIGS. 1 and 2. The valve 40' commonly incorporated with the nozzle passage 50' and the injection machine 20' is a rotatable rod having two through-holes 40'A, 40'B extending perpendicularly from each other, one 40'A for interrupting the nozzle passage 50' and the other 40'B for interrupting the communication between the interiors of the metering machine body part 22'B and the plasticizing machine body part 22'A when the metering is completed.

The metering machine part 20'B comprises a metering chamber 26'B and a piston-cylinder 27'B having an injection rod plunger 23'B extending into the metering chamber 26'B. The injection rod plunger 21'B abuts against a fixed stopper 24'B at its forward end after it moves forwardly for injection. The plunger 21'B also its rear end after it is forced to retract or move rearwardly with a plasticized material forced by a rotating screw plunger 21'A provided in the plasticizing machine part 20'A having another piston-cylinder. The position of the adjustable stopper 24'B is adjusted according to a metered amount of the plasticized material to be required.

A block 30' forms a section of the nozzle passage 50' therein and is provided with the valve 40'. The block 30' and a hot runner mold 15 incorporated with a manifold 16, which corresponds to that of FIG. 1 and 2, in combination, forms the entire nozzle passage 50', and also forms sections a and b of both the two machine body parts 22'A and 22'B.

The two part injection machine 20' is provided to operated with an improved precise metering effect compared with a conventional single barrel type injection machine to which the first and second embodied machines of FIG. 1 and FIG. 3 belong.

The two part injection machine 20' is incorporated with a mold arrangement 10 corresponding to that of FIGS. 1 or 3 and a hot runner mold 15 corresponding to that of FIGS. 1 or 3, and is operated as shown in the operational flow chart of FIG. 6 as well as the single barrel type injection machine 20 provided with the valve 40 (FIG. 1), but with the injection machine forward movement (a) and the compacted material sucking back by the injection machine (b) being omitted from the machine operation.

With this apparatus, a corresponding material pressure-holding step is divided into first and second substeps (I) and (II). The first substep (I) is carried out subsequent to the injection with a first fixed closed space Y formed by a combination of the mold cavity 11 and the entire nozzle passage 50' having a rear end defined by the injection plunger 21'B abutting against the fixed stopper 24'B, which space Y is compacted with the entire injected material to thereby have the injected material exert a first non-stepped internal pressure on the material against the mold cavity (FIG. 12).

Figure 12:
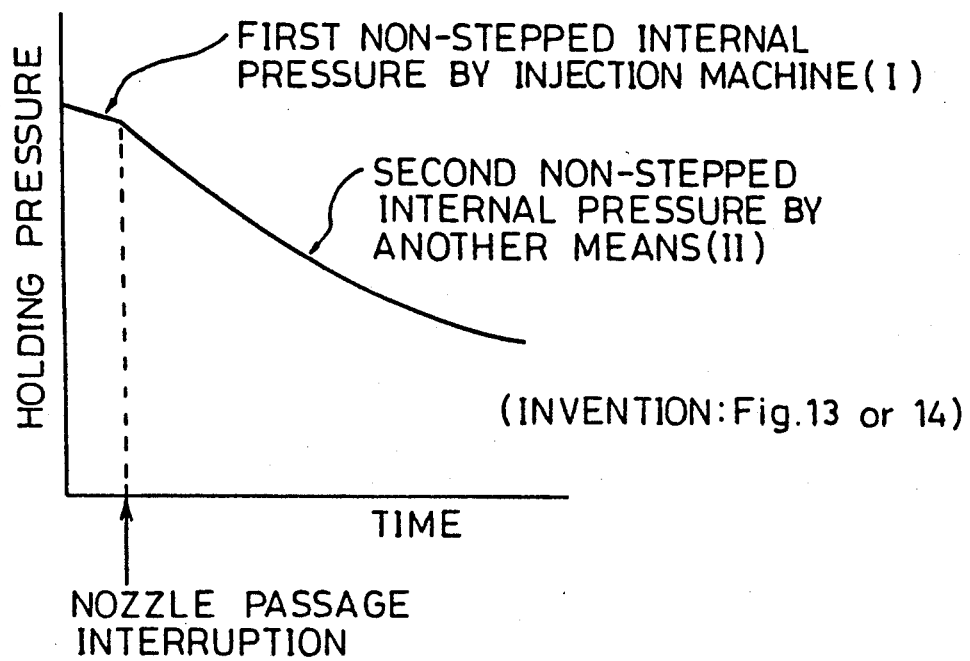

Upon the nozzle passage interruption (i) effected by the valve 40', the second substep (II) is commenced with a second fixed closed space X defined by the valve 40', which space X is compacted with a forward portion of the injected material separated due to the valve 40' to thereby have the compacted material exert a second non-stepped internal pressure on the material against the mold cavity 11 (FIG. 12).

Concurrently, upon the nozzle passage interruption (i) the plasticizing and metering step (III) is commenced for a next shot.

During the nozzle passage interruption (i), the valve 40' is closed at the hole 40'A and is open at the other hole 40'B to have the metering machine part 20'B communicate with the plasticizing machine part 20'A. The nozzle passage interruption (i) is released, that is the nozzle passage 30' is opened just after the mold arrangement 10 is closed (ii).

In this connection, the two part injection machine 20' attains the same advantages as those of the two kinds of machines 20 shown in FIGS. 1 and 3.

Preferably, the volume of a forward part of the nozzle passage 50' defined by the valve 40' when the nozzle passage interruption (i) is effected is designed to be the same as that of the mold cavity 11. With the machine of FIGS. 1 or 4, the volume of a forward part of the nozzle passage 50 defined by the valve 40 or the valve functioning piston-cylinder 60 when the nozzle passage interruption (i) is effected is also preferably designed to be the same as that of the mold cavity 11.

The valves 40 and 40' of FIG. 1 and FIG. 13 and the valve functioning piston-cylinder 60 of FIG. 3 may be preferably modified to exhibit substantially the same function as that of a conventional nozzle opening adjusting valve with which a degree of opening of the nozzle passage at a certain position is adjusted for regulating an injection flow condition.

However, it should be noted that the above valve means 40, 40' and 60 of the present invention cannot be modified to exhibit substantially the same function as that of a conventional nozzle shut-off valve or a conventional needle valve nozzle for preventing the material remaining in the nozzle passage from leaking out of the nozzle when the nozzle is removed from the mold arrangement or when a molded article is removed from the mold cavity. This is because the function of the valve means 40, 40' and 60 exhibited upon the nozzle passage interruption, for carrying out the second material pressure-holding substep comprising a predominant part of the overall time period of the material pressure-holding step per se, is in contradiction to the inherent function of the nozzle shut-off valve which is exhibited upon substantial completion of the entire material pressure-holding step.

To sum up, with respect to the effect on the contour quality of a molded article attained by the material pressure-holding, the internal pressure system of the present invention, a so called "material pressure-holding chamber system" is substantially equivalent or superior to a conventional external pressure system involving a sophisticated computer control. This is highlighted by the fact that the material pressure-holding chamber system inherently requires no computer control. Further, the present invention attains a surprising effect that molding productivity can be considerably increased within a limit due to the mold cooling capability in spite of the fact that the injection machine performance is allowed to be considerably lower with the effect that the material quality of a plasticized material is enhanced and the machine cost and the operation cost both are considerably reduced, compared with the prior art.

Further, the above surprising effects of the present invention are enhanced as the thickness of a molded article is increased, since the thicker article requires a longer time of the material pressure-holding step.

TABLE I

Styrene Polymer VHS Half Case (4 mold Cavities)

[ 220 ton Injection Machine with a 58 mmφ Screw Plunger ]

| Step | Time (sec) |
|---|---|
| Injection | 0.95 |
| Holding Pressure | 5.09 |
| Multi-Stepped I | 1.70 |
| External II | 3.39 |
| Pressure III | |
| Mold Cooling | 5.00 |
| Injection Plunger Waiting | |
| Nozzle Shutting | |
| Sucking Back | 3.50 |
| Plasticizing & Metering (Prior art) | |
| Plasticizing & Metering (Invention) | |
| Mold Opening Time | 1.00 |
| Molded Article Removing Time | 1.75 |
| Mold Clamping | 0.80 |
| Mold Clamping to Mold Opening | 11.00 |
| Mold Opening to Mold Clamping | 3.89 |
| One Shot Cycle Time | 14.59 |

TABLE II

Styrene Polymer VHS Half Case (2 mold Cavities)

[220 ton Injection Machine with a 58 mmφ Screw Plunger]

| Step | Time (sec) |
|---|---|
| Injection | 1.17 |
| Holding Pressure | 4.53 |
| Multi-Stepped I | 0.50 |
| External II | 1.50 |
| Pressure III | 2.53 |
| Mold Cooling | 4.00 |
| Injection Plunger Waiting | 0.00 |
| Nozzle Shutting | 1.60 |
| Sucking Back | 0.50 |
| Plasticizing & Metering (Prior art) / (Invention) | 4.60 |
| Mold Opening Time | 1.01 |
| Molded Article Removing Time | 1.72 |
| Mold Clamping | 1.07 |
| Mold Clamping to Mold Opening | 9.50 |
| Mold Opening to Mold Clamping | 4.00 |
| One Shot Cycle Time | 13.50 |

I claim:

1. A process for injection molding an article comprising the steps of:

heating, plasticizing and metering a plastic material within a body of an injection machine, the injection machine having an injection plunger in communication via a nozzle passage with a mold arrangement, the mold arrangement having a mold cavity that includes a gate for communication between the mold cavity and the nozzle passage;

injecting the metered material using the injection plunger through the nozzle passage toward the mold cavity;

exerting an external holding pressure using the injection plunger on the injected material so as to compact the injected material within the nozzle passage and the mold cavity;

interrupting the nozzle passage at a location in the nozzle passage spaced from the gate of the mold cavity to define a closed space comprising the mold cavity and a preselected portion of the nozzle passage between the gate and the location of the interruption, the closed space being fixed in volume by the interruption to cause an internal holding pressure by the compacted material within the fixed space of the mold cavity and the preselected portion of the nozzle passage;

the step of interrupting the nozzle passage being carried out by using a non-pressurizing valve to interrupt communication between the body and the mold cavity without applying pressure to the compacted material within the closed space;

heating, plasticizing and metering further material in the body of the injection machine for a subsequent article while the nozzle passage is interrupted;

and, during said nozzle passage interruption, cooling the mold arrangement to thereby automatically and continuously decrease said internal holding pressure due to self-contraction of the compacted material, and during said pressure decrease, freezing or solidifying a portion of the compacted material received in the mold cavity to provide the first mentioned article.

2. The process according to claim 1, wherein the internal holding pressure step is of longer duration than the external holding pressure step.

3. The process according to claim 2, wherein the step of heating, plasticizing and metering the further material is carried out during a period of time of substantially similar duration to the duration of the internal holding pressure step.

4. The process according to claim 1 wherein the cooling step is carried out upon nozzle passage interruption.

5. The process according to claim 1, wherein the external pressure is applied as a non-stepped pressure.

6. The process according to claim 1, wherein the external pressure is applied as a stepped pressure.

7. The process according to claim 1, wherein a hot runner mold forms a forward part of the nozzle passage.

8. The process according to claim 7, further comprising a step of sucking back hot material remaining in the hot runner mold by mechanically expanding the volume of the closed space before the mold arrangement is opened to remove the molded article but while the nozzle passage interruption is maintained to thereby release the hot material from the compaction.

9. The process according to claim 8, wherein a local portion of the hot material at the gate is frozen by cooling of the mold arrangement, and wherein said frozen local material portion is melted by heat temporarily applied after the sucking back step is completed and just prior to a next injection.

10. The process according to claim 9, wherein the nozzle passage interruption is released so that the mold cavity communicates with the interior of the body of the injection machine for a next injection before the frozen local portion of the material melts.

11. The process according to claim 10, wherein the hot plasticized material metered for the subsequent article is substantially equivalent to that of the first molded article.

12. An apparatus for injection molding articles, which comprises:
- an injection machine comprising a machine body provided with a piston cylinder formed in the interior thereof and arranged to receive a heated plastic material for forming a first article;
- an injection plunger arranged for controlled axial movement within the piston cylinder;
- a hollow extension forming a nozzle passage from the machine body;
- a mold defining a cavity having a gate, the mold being coupled with the injection machine so as to communicate with the machine body via the nozzle passage so that controlled axial movement of the injection plunger injects the heated plastic material received within the body under pressure through the nozzle passage toward the mold cavity;
- the injection plunger operating under the controlled axial movement for injection of at least a portion of the heated plastic material into the mold cavity; and
- a controlled nozzle passage interruption valve arranged at a location spaced from the gate for controlled movement relative to the nozzle passage after the injection of the heated plastic material by the injection plunger is completed, to controllably interrupt the communication between the machine body and the mold cavity and to form a closed space comprising a portion of the nozzle passage adjacent to the mold cavity, and between the mold cavity and the valve, and the mold cavity so that the injection machine is available to commence a molding operation for a second article,
- the valve being a non-pressurizing valve operating to interrupt the communication after the injection of the heated plastic material by the injection plunger is completed, without applying pressure to the heated plastic material within the closed space, the closed space being defined only by the nozzle passage portion, the non-pressurizing valve and the mold cavity so that it is fixed in volume, wherein the valve interrupts the nozzle passage after the injection plunger of the heated plastic material by the injection plunger is completed to cause a predetermined portion of the injected material to be compacted in the fixed closed space so that the compacted material exerts an internal pressure to urge itself against the mold after the injection of the heated plastic material into the mold cavity;
- wherein the volume of the mold cavity is approximately equal to the volume of the remainder of the closed space.

13. The process according to claim 12, further comprising a hot runner mold arranged downstream of the valve and forming a portion of the nozzle passage.

14. The process according to claim 12, further comprising a heater for instantaneously heating a part of the material at the gate of the mold.

15. An apparatus for injection molding articles, which comprises:
- an injection machine comprising a machine body provided with a piston cylinder formed in the interior thereof and arranged to receive a heated plastic material for forming a first article;
- an injection plunger arranged for controlled axial movement within the piston cylinder;
- a hollow extension forming a nozzle passage from the machine body;
- a mold defining a cavity having a gate, the mold being coupled with the injection machine so as to communicate with the machine body via the nozzle passage so that controlled axial movement of the injection plunger injects the heated plastic material received within the body under pressure through the nozzle passage toward the mold cavity;
- the injection plunger operating under the controlled axial movement for injection of at least a portion of the heated plastic material into the mold cavity; and
- a controlled nozzle passage interruption valve arranged at a location spaced from the gate for controlled movement relative to the nozzle passage after the injection of the heated plastic material by the injection plunger is completed, to controllably interrupt the communication between the machine body and the mold cavity and to form a closed space comprising a portion of the nozzle passage adjacent to the mold cavity, and between the mold cavity and the valve, and the mold cavity so that the injection machine is available to commence a molding operation for a second article,
- the valve being a non-pressurizing valve operating to interrupt the communication after the injection of the heated plastic material by the injection plunger is completed, without applying pressure to the heated plastic material within the closed space, the closed space being defined only by the nozzle passage portion, the non-pressurizing valve and the mold cavity so that it is fixed in volume, wherein the valve interrupts the nozzle passage after the injection of the heated plastic material by the injection plunger is completed to cause a predetermined portion of the injected material to be compacted in the fixed closed space so that the compacted material exerts an internal pressure to urge itself against the mold after the injection of the heated plastic material into the mold cavity;

wherein the controlled nozzle passage interruption valve is controlled to interrupt the communication at a present time after injection by the injection plunger is commenced, the preset time being sufficient to cause the interruption of the communication to occur after the injection of the heated plastic material by the injection plunger is completed.

16. The apparatus of claim 15 further comprising a hot runner mold arranged downstream of the valve and forming a portion of the nozzle passage.

17. The apparatus of claim 15 further comprising a heater for instantaneously heating a part of the material at the gate of the mold.

* * * * *